United States Patent [19]
Beale

[11] Patent Number: 5,775,273
[45] Date of Patent: Jul. 7, 1998

[54] FREE PISTON INTERNAL COMBUSTION ENGINE

[75] Inventor: William T. Beale, Athens, Ohio

[73] Assignee: Sunpower, Inc., Athens, Ohio

[21] Appl. No.: 886,647

[22] Filed: Jul. 1, 1997

[51] Int. Cl.$^6$ .................................................. F02B 71/00
[52] U.S. Cl. ............................................................ 123/46 B
[58] Field of Search ............................ 123/46 R, 46 E, 123/46 B

[56] References Cited

U.S. PATENT DOCUMENTS

| | | | |
|---|---|---|---|
| 2,473,204 | 6/1949 | Huber | 123/46 B |
| 2,949,541 | 8/1960 | Addie et al. | 123/46 B |
| 3,267,916 | 8/1966 | Moiroux et al. | 123/46 B |
| 3,308,796 | 3/1967 | Guy et al. | 123/46 B |
| 3,986,796 | 10/1976 | Moiroux et al. | 123/46 SC |
| 4,142,485 | 3/1979 | Moiroux et al. | 123/46 SC |
| 4,205,528 | 6/1980 | Grow . | |
| 4,415,313 | 11/1983 | Bouthors et al. . | |
| 4,530,317 | 7/1985 | Schutten . | |
| 4,873,822 | 10/1989 | Benaroya . | |
| 5,123,245 | 6/1992 | Vilenius et al. . | |
| 5,269,280 | 12/1993 | Braun et al. | 123/46 R |
| 5,287,827 | 2/1994 | Almendinger et al. | 123/46 R |
| 5,363,651 | 11/1994 | Knight . | |

*Primary Examiner*—David A. Okonsky
*Attorney, Agent, or Firm*—Frank H. Foster; Kremblas, Foster, Millard & Pollick

[57] ABSTRACT

A free piston internal combustion engine having improved valve timing. A pair of oppositely disposed combustion chamber passageways extending between the combustion chamber and the earth's atmosphere, each have a combustion chamber valve for controlling the passage of gas through the passageways. The combustion chamber valves are essentially simultaneously opened and closed to permit independent variation and control of the compression ratio, expansion ratio, and stroke of the engine. When the valves are opened, the combustion chamber is purged or supercharged with combustion supporting air, and closed to initiate compression. Variable control of the piston positions at which the valves are opened and closed permits the engine to operate at a high efficiency over a broad range of power output loading conditions.

26 Claims, 8 Drawing Sheets

FREE PISTON INTERNAL COMBUSTION ENGINE

TECHNICAL FIELD

This invention relates generally to internal combustion engines, and more particularly relates to improvements in free piston internal combustion engines. The invention frees the internal combustion engine from the constraints of the rigid construction limitations of previously existing internal combustion engines. It does this by uniquely combining features of free pistons, computer control and complete control of valve and valve actuator timing so that the engine can be automatically adjusted to operate under optimum operating conditions for a specific load over a broad range of load conditions. The engine embodying the present invention provides extraordinary freedom of control of all elements or parameters of engine operation so the engine operates at or close to optimum operating conditions for whatever power demand it is currently being presented.

BACKGROUND ART

The internal combustion engine, fueled by liquid petroleum products, has long been the mainstay for supplying mechanical power to a broad variety of mobile and stationary machines. There have been many developments for improving the fuel conversion efficiency of such engines. Although most internal combustion engines which are commercially produced and used today utilize reciprocating pistons which are confined to the motion limits permitted by a crank shaft and interconnected connecting rods, there have also been free piston internal combustion engines. For example, free piston internal combustion engines are shown in U.S. Pat. Nos. 4,873,822; 5,123,245; 5,363,651; 4,530,317; 4,415,313; and 4,205,528. Although most of these engines can be designed and operated to provide a high efficiency at a single selected power output load condition, few engines are called upon to operate under only one load condition. Most internal combustion engines must supply power which varies over a broad range from a low power to a high power.

Three parameters which are important to both the efficiency and the power of an internal combustion engine are stroke or displacement, expansion ratio, and compression ratio. Conventional crank-type internal combustion engines permit no controlled adjustment of any of these parameters. The efficiency of an internal combustion engine is also a function of the ratio of the compression ratio to the expansion ratio. In the conventional internal combustion engine, neither is variable. The power of an internal combustion engine is proportional to the mass flow of air, properly mixed with fuel, through the combustion chamber and therefore is also a function of piston displacement. However, piston displacement is not variable in a crank-type engine.

It is a feature and object of the present invention to provide a free piston internal combustion engine in which not only are all four of these parameters controllably variable, but additionally the expansion ratio and the compression ratio are adjustable independently of each other. This permits the engine to operate with a different expansion ratio than compression ratio and also allows the displacement or stroke of the engine to be controlled. Consequently, upon a low power demand the engine of the present invention can operate with an expansion ratio which is considerably greater than the compression ratio so that it can operate with more nearly full expansion, resulting in a higher proportion of the heat energy of combustion being converted to mechanical output power. For greater power demands, both the engine displacement and the expansion ratio can be varied so as to achieve maximum efficiency for a given power demand.

BRIEF DISCLOSURE OF INVENTION

The invention is an improved free piston, internal combustion engine of the type having at least one piston slidingly and sealingly reciprocatable in a cylinder and preferably having two opposed pistons reciprocating in opposite directions within the cylinder. Each piston has an end face bounding and defining a central combustion chamber. The engine also includes a driver linked to the piston for driving the piston through its compression stroke. The driver is preferably a spring acting upon each piston and storing energy during the expansion stroke of the piston in order to obtain a flywheel effect. The engine also includes a fuel injector, and may also include a spark ignitor for initiating combustion.

The improvement of the invention includes at least one and preferably two combustion chamber valves, each in a passageway extending between the combustion chamber and the earth's atmosphere for controlling the passage of gas between the combustion chamber and the earth's atmosphere. A valve closing actuator is linked to at least one combustion chamber valve. A piston-position sensor is linked to the valve closing actuator and initiates closure of the valve in response to a controllably variable, selected position of the piston in the cylinder. A piston-position responsive, valve opening actuator is also linked to the combustion chamber valve. The two combustion chamber valves open and close essentially in synchronism. Preferably a blower or other air impeller apparatus is connected to the passageways for purging the combustion chamber when the combustion chamber valves are opened and for providing air for supporting combustion.

In operation, the valves are opened to vent the combustion chamber near the desired end of an expansion stroke. Opening the valves terminates the expansion of combustion gas and initiates exhaust and purge of combustion products and, with a sufficient blower, supercharging of the combustion chamber. The valves are closed to terminate the venting and the purge at a controllably, variable piston position, thus terminating the exhaust and initiating the compression.

Under varying load conditions, engine control includes not only varying the quantity of fuel injected into the combustion chamber, but also varying the piston position at which the valves are opened and the piston position at which the valves are closed in order to tailor the engine operation so that it provides the required engine power at the maximum efficiency at which that power can be supplied.

Figure 1:
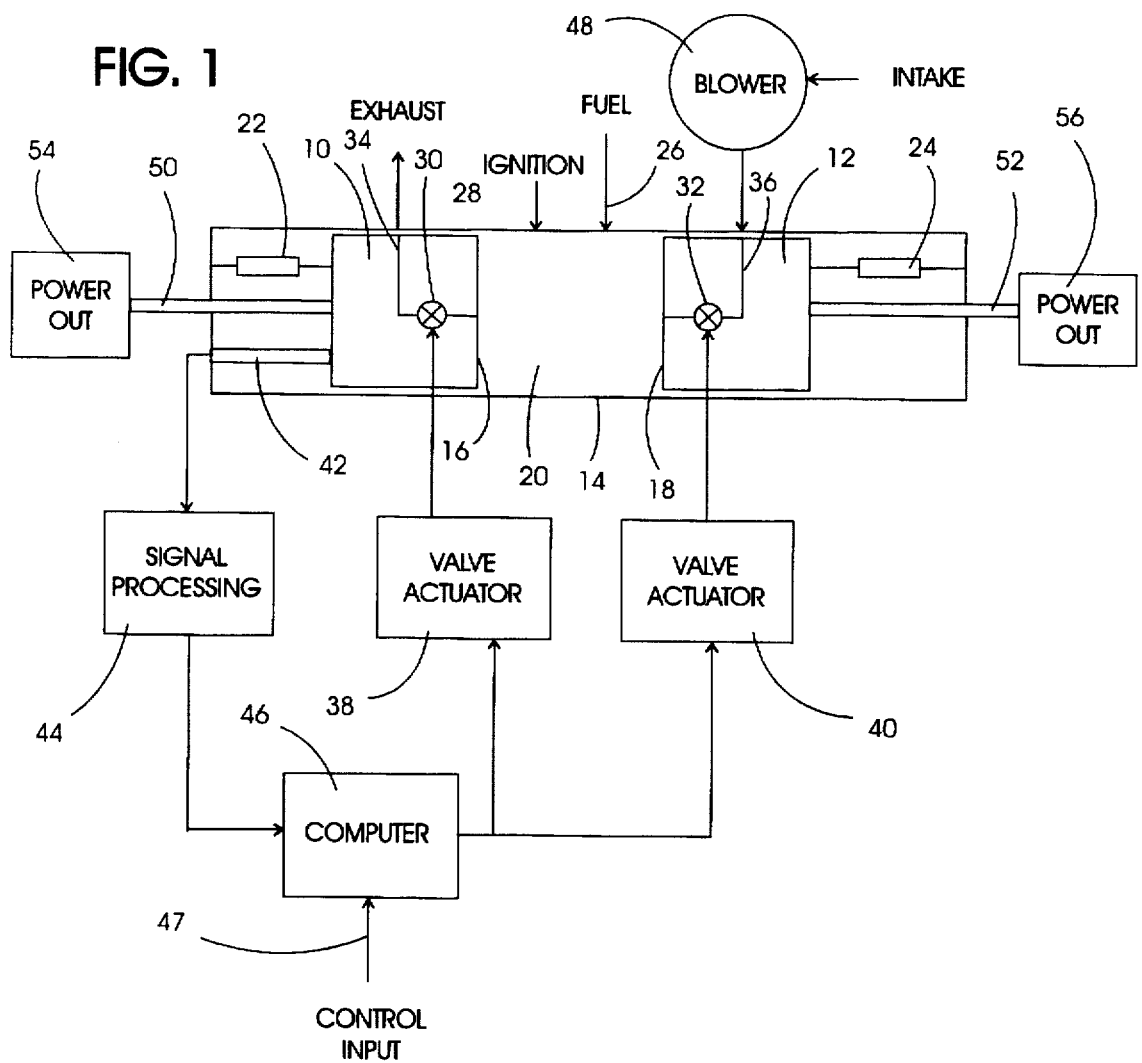
FIG. 1 is a block diagram illustrating fundamental principles of the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art. In addition, circuits are illustrated which are of a type which perform well known operations on electronic signals. Those skilled in the art will recognize that there are many, and in the future may be additional, alternative circuits which are recognized as equivalent because they provide the same operations on the signals.

DETAILED DESCRIPTION

Fundamental principles of the present invention are illustrated in FIG. 1. FIG. 1 illustrates a free piston internal combustion engine having a pair of pistons 10 and 12, sealingly slidable and reciprocatable in a cylinder 14 and operated in opposed phase. End face 16 of piston 10 and end face 18 of piston 12 bound and define a combustion chamber 20.

A driver 22 is linked to piston 10 and a similar driver 24 is linked to piston 12 for driving the respective pistons through their compression strokes. Such drivers are known to those skilled in the art and preferably comprise an energy storage device for storing energy resulting from the work generating expansion stroke, and returning the stored energy to the piston during the compression stroke in order to obtain a flywheel effect. The preferred driver is a coil spring, gas spring, planar spring or other spring having a spring constant for resonating the piston mass at a selected operating frequency of the engine. Alternatively, the driver may be a hydraulic, pneumatic, mechanical inertia or electrical system for storing and returning energy in the manner known in the art. For example, a part of the power output can be used to drive a hydraulic motor providing a high pressure reservoir of hydraulic fluid used to drive a hydraulic cylinder or other hydraulic actuator utilized as the driver 22 or 24.

The engine also has a fuel injector 26, preferably for injecting fuel under high pressure in the manner and utilizing structure common in the prior art. The engine preferably has an ignition system 28, such as a conventional spark plug, although ignition can be initiated by sufficient compression of the fuel as is common in diesel engines. Preferably, however, the spark is a high energy spark for ignition of lower volatility fuels to permit operation of the engine with a broad range of fuels, such as kerosene, natural gas, diesel fuel, gasoline and hydrogen, for example.

A combustion chamber valve 30 is provided in piston 10, and similarly a combustion chamber valve 32 is provided in piston 12. Each combustion chamber valve is connected with a passageway, 34 and 36 respectively, so that each combustion chamber valve controls the passage of gas between the combustion chamber 20 and the earth's atmosphere. The combustion chamber valve 30 is connected to a valve actuator 38, and the combustion chamber valve 32 is connected to a valve actuator 40. Although each valve actuator generally may operate both to close and to open each of the respective valves, it will be seen that it is alternatively possible that one of the valves, such as valve 32, can be a check valve, and the other valve may be closed by the valve actuator and opened by gas pressures in some embodiments of the invention. In recent years the prior art has developed various electrically controlled valves which are sufficiently fast that they would also work well as the combustion chamber valves of the present invention.

At least one of the pistons, piston 10 in FIG. 1, is provided with a piston position transducer 42 for providing a signal representing the piston position. A variety of such piston position transducers are known to those skilled in the art. These include a strain gauge mounted to a coil spring, a linear, variable differential transformer or any of the position transducers illustrated in the following U.S. patents which are hereby incorporated by reference: U.S. Pat. Nos. 5,342,176; 4,926,123; 4,912,409; 4,866,378; and 4,864,232. The piston position transducer 42 is connected to a signal processing circuit 44, which may include an analog to digital converter, which in turn is connected to a digital computer 46. All of the actuating and control functions are controlled by the computer, just as such functions are conventionally controlled in modern conventional, internal combustion engines.

The position transducer 42, signal processing circuit 44 and computer 46 operate as a piston position sensor which is connected to the valve actuators 38 and 40 in the generalized embodiment of the invention. Together they provide a signal to the valve actuators 38 and 40 at a selected piston position for closing the valves 30 and 32. Generally, they may also provide a different signal to the valve actuators 38 and 40 for opening those valves. A control input 47 may also be provided to the computer 46 for controlling the engine, such as for controlling its power output or stroke or other parameter or parameters. The control input 47 may also be incorporated into a feedback control system.

Although both combustion chamber valves 30 and 32 may be directly opened by valve actuators when the piston position sensor detects a selected piston position, check valves or other pressure responsive valves will open and close in response to pressure differentials across them. Such pressure responsive valves are piston position responsive in the invention in the sense that the pressure within the combustion chamber is a function of piston position.

In operation, the combustion chamber valves 30 and 32 are opened and closed nearly simultaneously, although not necessarily precisely simultaneously because of inertia and gas dynamic effects. A blower 48 is preferably provided for purging combustion product gasses from the combustion chamber when the combustion chamber valves 30 and 32 are opened and for charging the combustion chamber with air for supporting combustion. The pressurized air is forced by the blower through passage 36, valve 32, the combustion chamber 20, valve 32 and passage 34. The blower 48 may operate at a pressure only slightly above atmospheric pressure to accomplish purging, or it may be a supercharger so it can not only purge, but also provide increased air mass in the combustion chamber.

Pistons 10 and 12 are connected through connecting rods 50 and 52 to respective loads 54 and 56 representing useful power out. Suitable loads are those conventionally known in the art and include hydraulic pumps, pneumatic pumps and electrical alternators. Some power from these loads can be used for driving auxiliary systems of the engines, such as the ignition and electronic processing systems, the air blower and the valve actuators. The hydraulic, pneumatic or electric power generated can also be stored for use in start-up by means of storage devices known in the art.

Operation of the invention may be described in connection with the pressure/volume diagram of FIG. 7. When the pistons 10 and 12 are at the outermost or distal position of their reciprocation paths, their position corresponds to point A in FIG. 7. The valves 30 and 32 are opened at point A and the pistons 10 and 12 are driven inwardly toward their central position by the drivers 22 and 24. As the pistons move inwardly from point A to point B along this initial, purge portion of the compression/purge stroke, no compression occurs and the blower forces combustion products from the combustion chamber and recharges the combustion chamber with fresh air. When the piston position of point B is detected by the piston position sensor, the piston position sensor actuates valve actuators 38 and 40 to close the valves 30 and 32 and initiate compression. Compression continues as the pistons move from point B to point C. Immediately after point C, fuel is injected and ignition is initiated and continues at least to approximately point D. The heat energy of the combustion continues to expand the gasses in the combustion chamber driving the pistons 10 and 12 apart along the expansion stroke to point A where the cycle is repeated.

Consequently, in the present invention the combustion chamber is vented at a piston position near the end of an expansion stroke to terminate further expansion of combustion gas and initiate exhaust of combustion products and recharging of the combustion chamber. The venting is terminated by closing the valves at a controllably, variable piston position B to terminate the exhaust and initiate compression. The invention permits varying of at least one and preferably both of the piston positions at which the valves are opened and closed to initiate and terminate venting in response to variations in desired output power and/or desired efficiency. Since expansion ratio is a function of the piston position at which the combustion chamber valves are opened and compression ratio is a function of the piston position at which the combustion chamber valves are closed, both the expansion ratio and the compression ratio may be independently controlled. Because piston stroke is a function of the positions at which the valves are opened and closed and the quantity of fuel which is combusted, the present invention not only permits independent, direct control of the piston position at which compression is initiated and the piston position at which expansion is terminated, but also permits control of the displacement or length of engine strokes.

Figure 2:
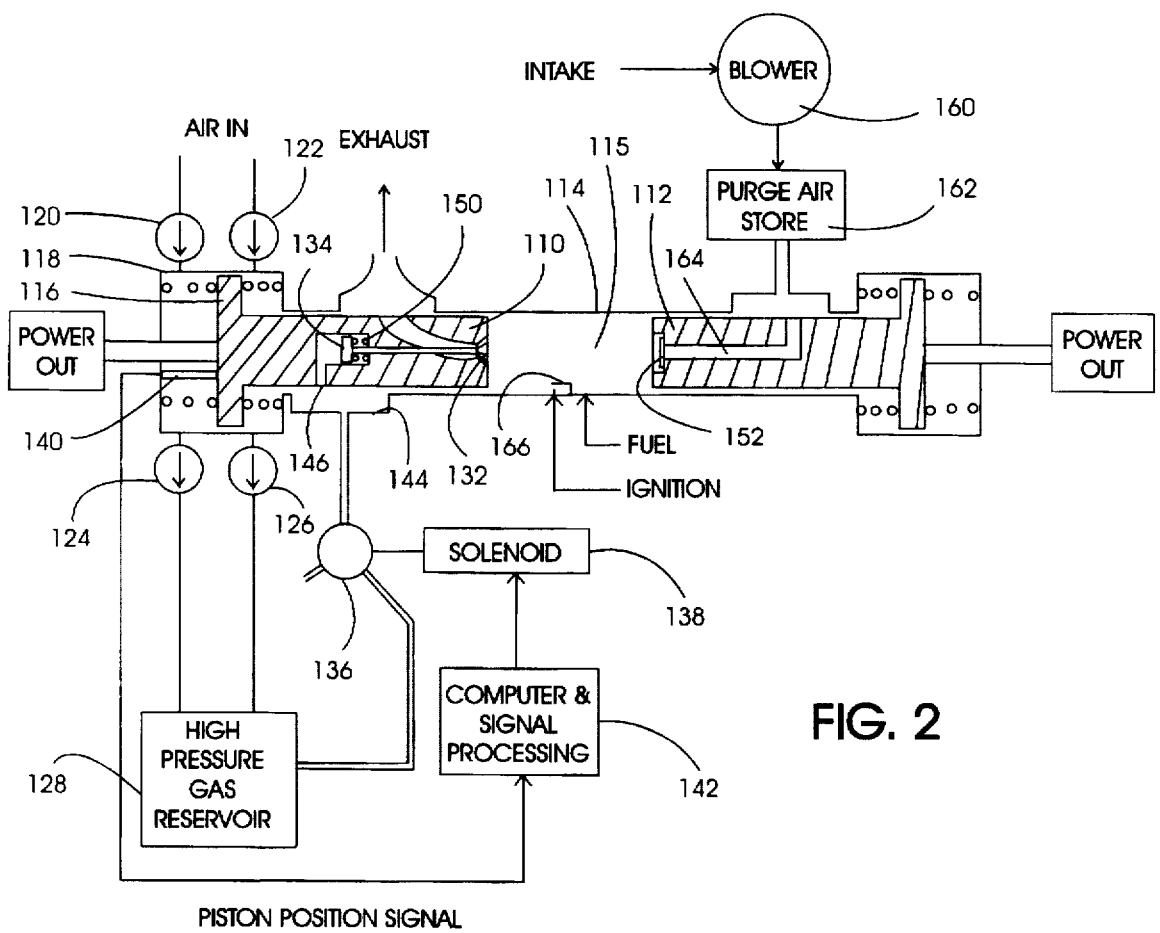
FIG. 2 is a diagram illustrating an embodiment of the invention.

FIG. 2 illustrates an alternative embodiment, including a variety of alternative components which may be substituted in other embodiments of the invention. The engine of FIG. 2 has a pair of pistons 110 and 112 reciprocating within a cylinder 114. Each piston is integrally formed with an air pumping apparatus. Piston 110 is identical to piston 112 so only one is described. A secondary piston 116 is formed as a skirt on the primary piston 110 and reciprocates within a pump cylinder 118. The pump is conventional in structure and double acting and is provided with intake check valves 120 and 122 and exhaust check valves 124 and 126. This air pump serves to pump ambient air into a high pressure gas reservoir 128 forming an accumulator which is used in a pneumatic system for operating the valve actuators. The driver for storing energy during the expansion stroke and driving the piston inwardly during the compression/purge stroke is a double acting coil spring 130, having a spring constant for supporting the piston 110 in resonance at or near the design frequency of operation of the engine.

The combustion chamber valve 132 is opened and closed by gas pressure applied and released from the high pressure gas reservoir 128 and acting upon a piston 134. The application and release of the pressure is controlled by a Y valve 136 which in turn is actuated by a solenoid 138 switched between two states. A piston position transducer 140 senses the instantaneous piston position and applies its signal to a computer and signal processing circuit 142 in the manner described in connection with FIG. 1. The high pressure gas is applied through the Y valve 136 to an annular groove 144 formed in the cylinder wall. The annular groove 144 is in registration with a port 146 in communication with the actuator piston 134. The annular groove 144 must extend in the axial direction sufficiently far to remain in communication with the port 146 during the stroke of the piston 110. The valve 132 is opened when the solenoid is switched to its first state and switches the Y valve 136 to apply pressure from the reservoir 128 to the valve actuator piston 134. The valve 132 is closed when the solenoid switches to its second state and switches the Y valve 136 to vent the high pressure gas from the annular groove 144, permitting a coil spring 150 to force the valve 132 closed. Therefore, the piston 134, spring 150, valve 136, solenoid 138 and high pressure reservoir 128 together provide a valve actuator responsive to the pressure applied from the fluid pressure source 128 and controlled by the interposed control valve 136.

The second combustion chamber valve 152 in piston 112 is a check valve not requiring a separate valve actuator and may be used alternatively in some embodiments of the invention. The check valve 152 opens after the combustion chamber valve 132 is opened at the end of the expansion stroke as a result of the pressure applied by the blower 160 and an associated purge air store 162. The differential pressure across the check valve 152 after combustion chamber valve 132 is opened permits forced air flow into the combustion chamber 115 through the intake passageway 164, but prevents flow in the opposite direction during compression, combustion and expansion.

FIG. 2 also illustrates the use of a conventional pair of spark plug electrodes 166 for initiating ignition in the conventional manner.

Figure 3:
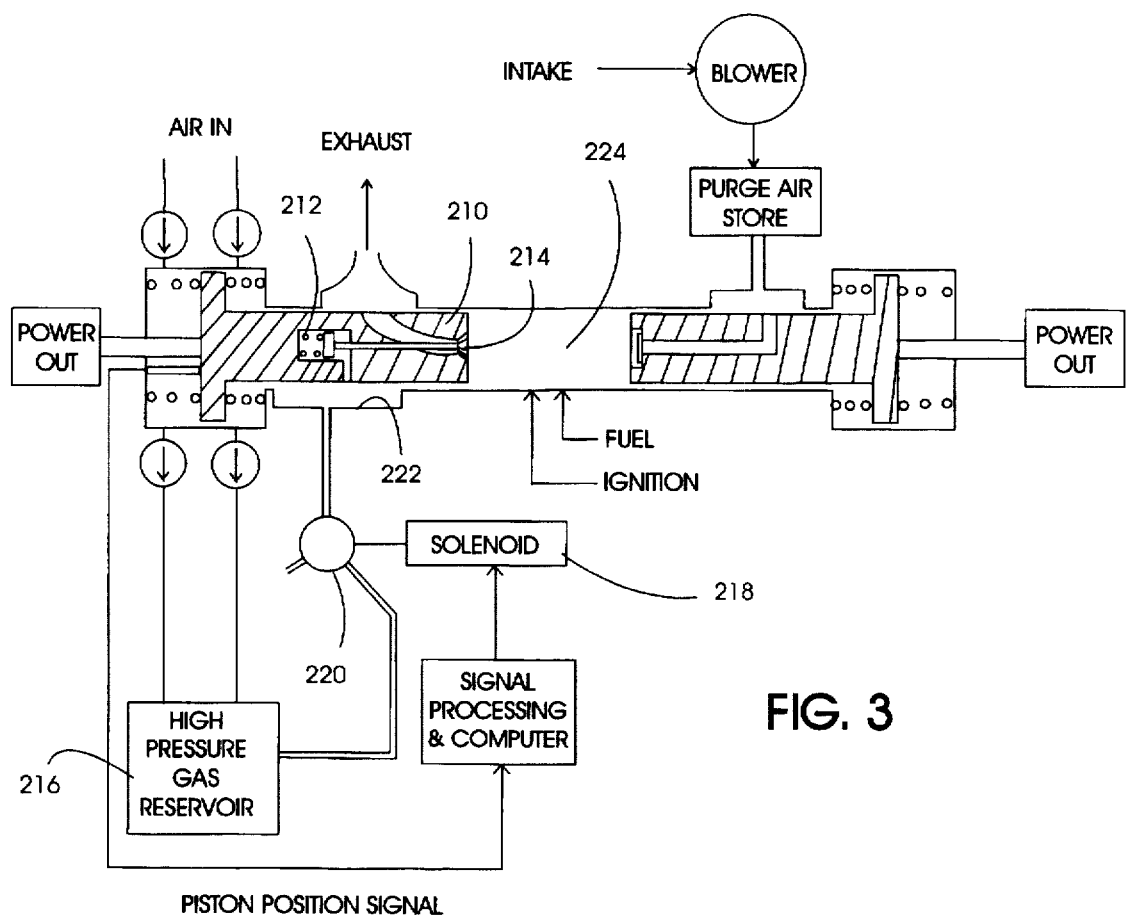
FIG. 3 is a diagram illustrating an alternative embodiment of the invention.

FIG. 3 illustrates an alternative embodiment of the invention which is like FIG. 2, except that the valve actuator for piston 210 includes a spring 212 biasing the combustion chamber valve 214 toward an open position instead of biasing the combustion chamber valve closed as in FIG. 2. In the embodiment of FIG. 3, high pressure is applied from the high pressure gas reservoir 216 to close the combustion chamber valve 214 in the same manner as the combustion chamber valve 132 illustrated in FIG. 2 is opened. However, the combustion chamber valve 214 is opened when the piston 210 travels sufficiently far along its expansion stroke that the combustion chamber pressure falls to less than a selected pressure. Specifically, the valve 214 opens when the force of the spring exceeds the force of the net differential pressure on the combustion chamber valve 214. Many other types of valve actuator systems known in the art may also be used, including cam and hydraulic valve actuating systems as well as valves driven directly by a solenoid.

Figure 4:
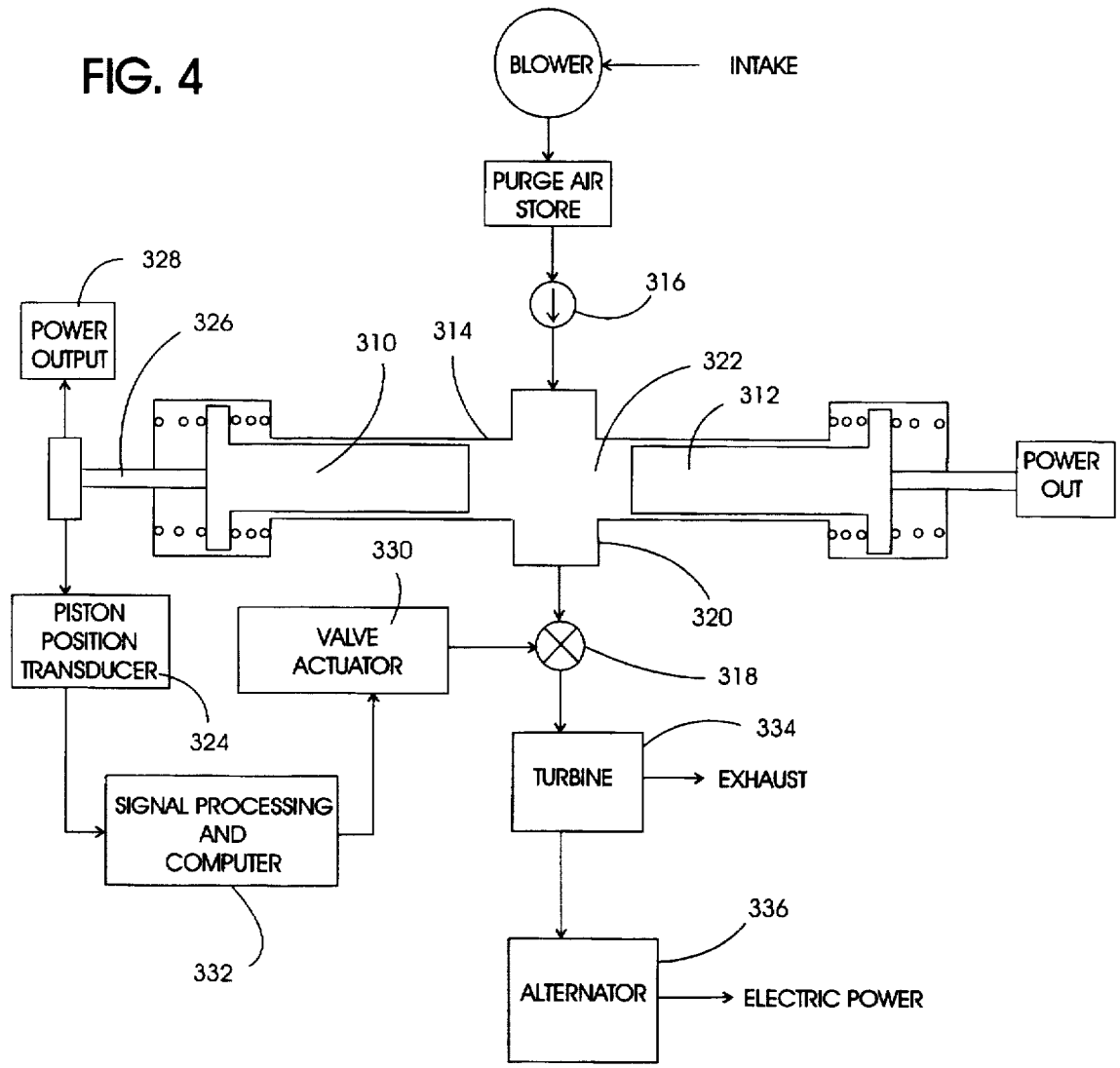
FIG. 4 illustrates yet another alternative embodiment of the invention.

FIG. 4 illustrates yet another alternative embodiment with alternative components which may be utilized in embodiments of the present invention. FIG. 4 illustrates an engine having a pair of pistons 310 and 312 sealingly reciprocating in a cylinder 314. In the embodiment of FIG. 4, the combustion chamber valves 316 and 318 are located in a head 320 formed in the cylinder wall at the combustion chamber 322, intermediate the pistons 310 and 312. The piston position transducer 324 may be connected to the exterior portion of the piston connecting rod 326, which is also connected to provide the power output 328. Although both valves 316 and 318 may be opened and closed by valve actuators in the manner previously described, FIG. 4 illustrates a combustion chamber intake valve 316 as a check valve in the manner illustrated in connection with FIGS. 2 and 3. The other combustion chamber valve 318 is switched on and off by its associated valve actuator 330 in response to the piston position transducer 324 and its signal processing and computer circuit 332, which together form a piston position sensor.

FIG. 4 also illustrates that the exhaust gasses from the combustion chamber 322 may be applied through a turbine 334 having its rotating shaft connected to an electrical power generating alternator 336 to extract additional energy from the expansion of the combustion products and converting it to electric power for use by auxiliary systems. Alternatively, if the power from the piston rods is utilized to pump a fluid which in turn drives a turbine, the exhaust gases may supplement that fluid, driving the same turbine.

Figure 10:
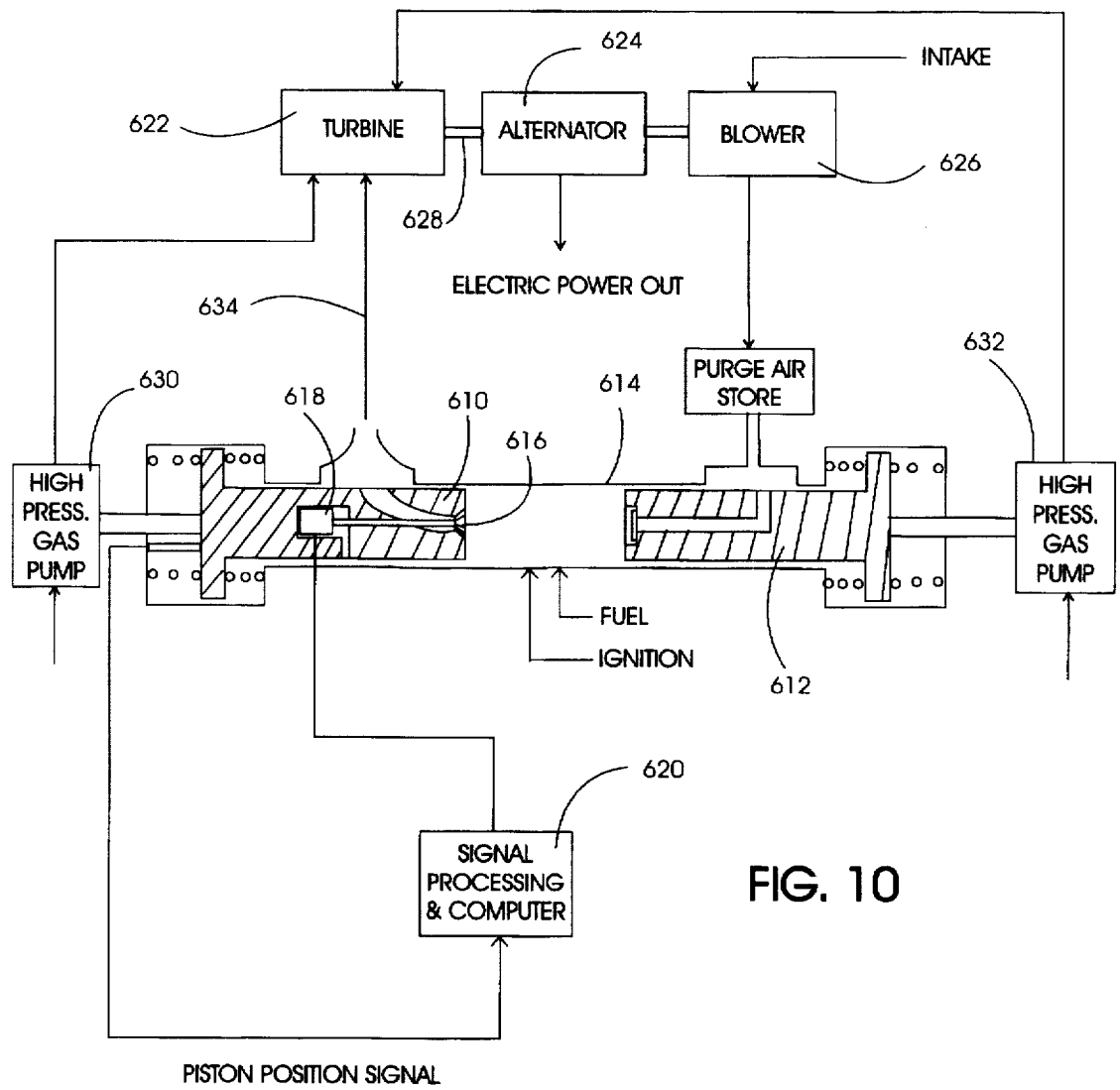
FIG. 10 illustrates another embodiment of the invention.

For example FIG. 10 illustrates the preferred embodiment, including free pistons 610 and 612 in cylinder 614. The embodiment is generally similar to that in the other figures. However, the combustion chamber valve 616 has an electrical solenoid actuator 618 connected to the signal processing and computer circuit 620. Furthermore, a turbine 622, electrical alternator 624, and a blower 626 are connected for rotation on the same shaft 628. The output power from the reciprocating, free pistons 610 and 612 is directed to high pressure gas pumps 630 and 632. These gas pumps 630 and 632, as well as the exhaust gases from the combustion process are directed through passageway 634 to the turbine 622 for powering the turbine. The turbine thus drives the alternator 624 and the purge blower 622 through their connection to the common rotating shaft 628. In this embodiment the final output power is the electric power from the alternator 624. Alternatively, the purge air can be derived from a portion of the high pressure gas from the high pressure gas pumps 630 and 632.

The alternator may be designed so that it can be energized as a motor by a storage battery during start-up, so that it will drive the purge blower for the initial charge of air in the cylinder 614. In this case it is preferred that an override clutch will disconnect the alternator from the turbine during start-up. Alternatively, the blower can be driven by its own dedicated, electric motor.

Figure 11:
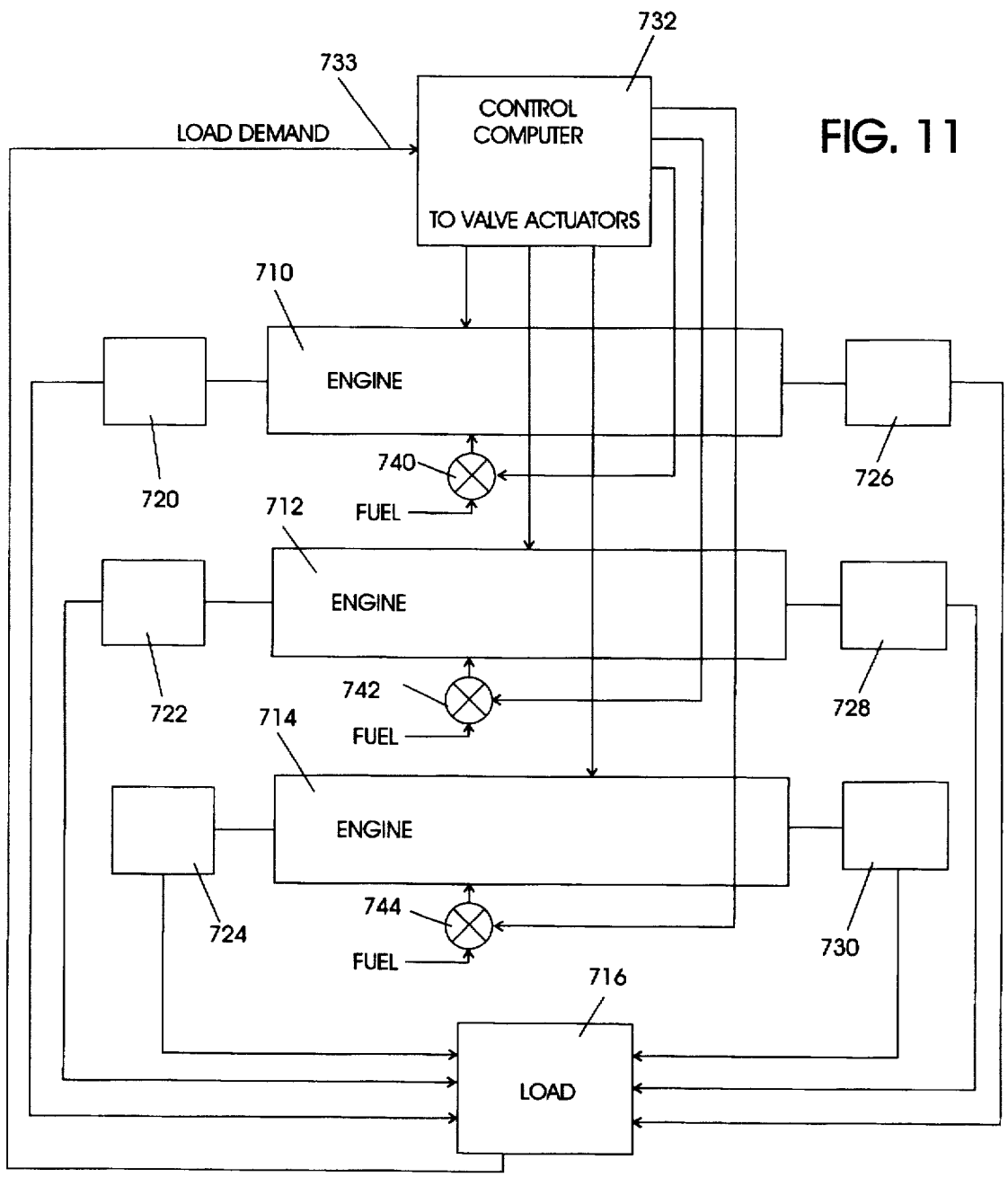
FIG. 11 is a block diagram of a multi-engine alternative embodiment of the invention.

Although the high pressure gas pumps are shown for clarity as separate blocks which are external of the engine in FIG. 10, they can advantageously be formed by pistons formed as skirts at the end of the free piston 610 and 612, in the manner illustrated in FIG. 3. FIG. 11 illustrates a multi-stage engine comprising a plurality of individual engines 710, 712, and 714. Each of these individual engines is an embodiment of the invention, such as illustrated in FIGS. 1 through 10, and described above. Any number of such individual engines may be utilized in the multi-stage engine, although three are illustrated. The pistons of each of the individual engines are connected through conventional linkage to supply output power to the same load, such as an electrical load 716. For example, the pistons may be connected to electrical alternators 720–730, connected to an electrical load 716. Any of the available alternative power output systems previously described, such as pneumatic or hydraulic, may also be used. Each of the individual engines 710–714 are connected to and controlled by a single control computer 732 in the manner described above. However, each of the individual engines may be selectively enabled or disabled by the computer in order to simultaneously operate selected individual engines, including fewer than all of the individual engines. This enables the multi-stage engine of FIG. 11 to operate with only those individual engines which are necessary to meet the current load demand, which is sensed by the computer from a load demand detector linked to the load 716 and connected at an input 733 to the computer to provide a load demand signal. For example, if the load 716 is electrical, an electric current, voltage, or power detector can operate a single, individual engine under light load and increase the number of engines as the load increases. Similarly, if the load is a vehicle which is propelled by the multi-stage engine, then at idle only a single, individual engine can be operated with all the engines operated for high acceleration and fewer than all for in-town cruising.

One manner of disabling an individual engine is to close its combustion chamber valves and maintain them in a closed position. This prevents the blower, illustrated in the other figures, from providing combustion air to the combustion chamber. Valves 740, 742, and 744, in communication with the fuel injectors, can also be turned off to prevent the injection of fuel into a disabled, combustion chamber. It will be apparent that other control means may also be used, such as disabling of the spark. Valves can also be provided through the blower passageways.

Figure 6:
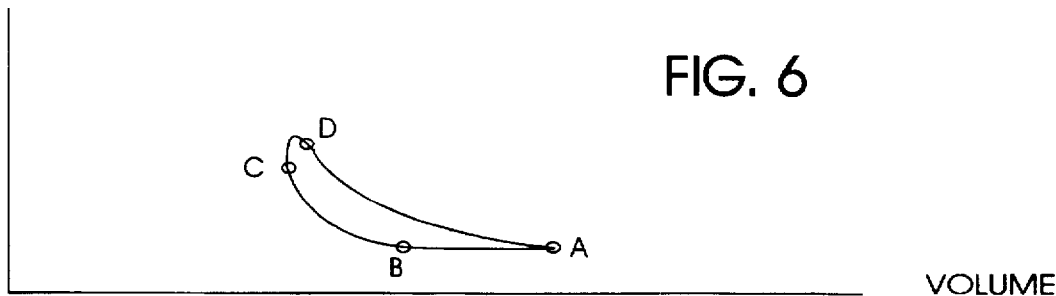
FIGS. 6, 7 and 8 are pressure/volume graphs illustrating the operation of embodiments of the invention under low, medium and high power conditions.
Figure 7:
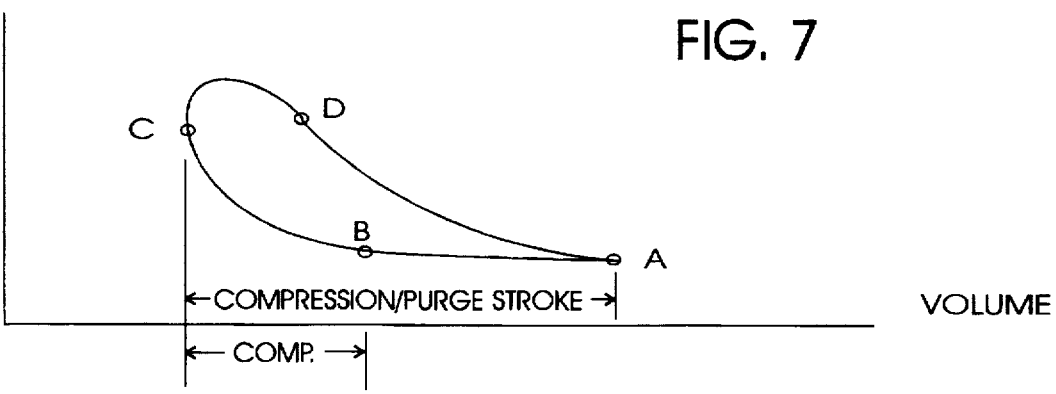
Figure 8:
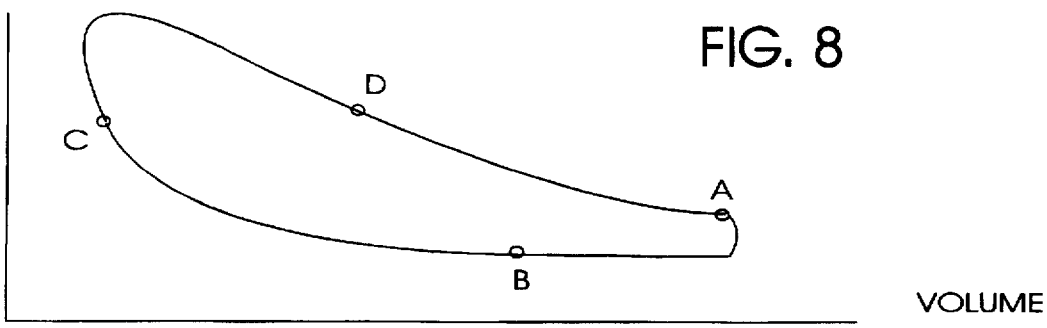

Control of engine power and efficiency with engines embodying the present invention is illustrated in FIGS. 6–8 and includes varying at least one of the piston positions at which the combustion chamber valves open or close, and preferably both, as well as controlled modulation of the quantity of fuel injected into the combustion chamber. In FIGS. 6–8, the vertical axis is positioned to represent the symmetrical center of the engine with piston displacement away from the center represented by distance along the horizontal axis. The engine is operated at a relatively low power, illustrated in FIG. 6, typically by moving the piston position A at which the combustion chamber valves are opened and the piston position B at which the combustion chamber valves are closed toward the left in the figures for reducing the piston stroke. Typically fuel supply is also reduced.

FIGS. 6 and 7 illustrate that a very high proportion of the energy of expansion in the combustion chamber is utilized in driving the piston as seen by observing that, at point A by the time the combustion chamber valves are opened, the combustion chamber pressure has fallen substantially to the pressure of the incoming supercharging pressure of the blower.

When a high power demand must be met, the position of combustion chamber valve opening A and combustion chamber valve closing B may be moved independently and rapidly toward the right and the quantity of injected fuel increased. FIG. 8 illustrates the position A having approached its limit and the position B moved sufficiently far to the right that the ratio of the portion of the expansion stroke from D to A, during which the heat energy of the combustion is extracted from the expanding gas, to the portion of the compression/purge stroke from B to C during which compression occurs, may be made nearly equal for high power output. This results in a relatively high rate of pressure drop after the point A and thus some loss of the combustion gas expansion energy. The loss from incomplete expansion is normally minimal and is only substantial when the engine is operating near the maximum power level. In the event that an exhaust gas turbine is fitted, even this incomplete expansion energy may be partially recovered in the expansion through the turbine. However, the power loss is not nearly as substantial as in a conventional internal combustion engine and is believed unavoidable for high power output from an engine of a practical size.

Figure 5:
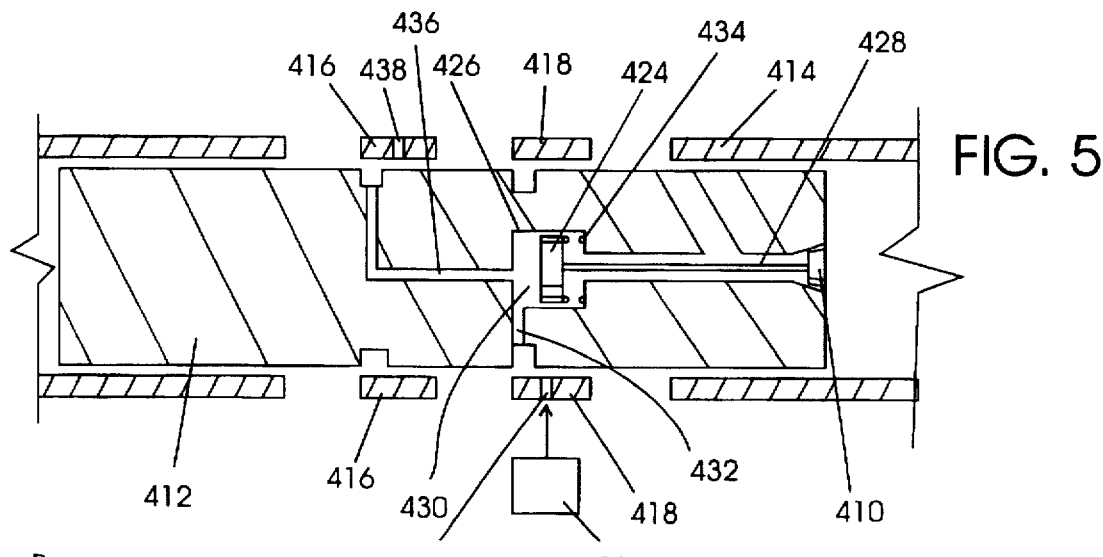
FIGS. 5 and 5A illustrate still another alternative embodiment of the invention.

FIG. 5 illustrates yet another alternative, though not preferred, embodiment of the invention which relies on sliding members forming a spool valve or slide valve for controlling the opening and closing of the combustion chamber valve 410. In FIG. 5 a piston 412 is mounted in a cylinder 414. A pair of annular slides 416 and 418 are aligned with the cylinder, but provided with sufficient space so they can slide axially to selected positions. A high pressure source 420 is applied to a port 422 through slide 418. A valve actuating piston 424 is sealingly reciprocable in a corresponding actuator cylinder 426 within the piston 412. The valve actuating piston 424 is connected by a connecting rod 428 to the valve 410. The chamber 430 within the cylinder 426 is connected through a piston passageway 432 to the high pressure source 420 when the passageway 432 comes into registration with the port 422 during translation of the piston 412. In this manner, the pressure from the source 420 forces the piston 424 against the force of a spring 434 to open the combustion chamber valve 410. Similarly, a piston passageway 436 is connected in communication with a port 438 in the slide 416 when the passageway 436 comes into registration with the port 438 to release pressure applied to the chamber 430 by the high pressure source 420, and therefore permit the spring 434 to force the combustion chamber valve 410 closed.

Consequently, the axial position of the annular slides 416 and 418 determine the piston position at which the combustion chamber valve 410 is opened and is closed.

Figure 5A:
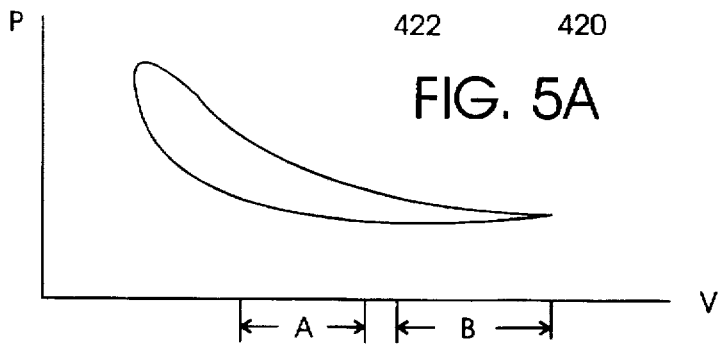

FIG. 5A illustrates a PV diagram for the embodiment of FIG. 5A. Desirably the valve would be closed somewhere in the range A, illustrated in FIG. 5A, and would be opened somewhere in the range B, the particular positions determined by the operating conditions of the engine.

Figure 9:
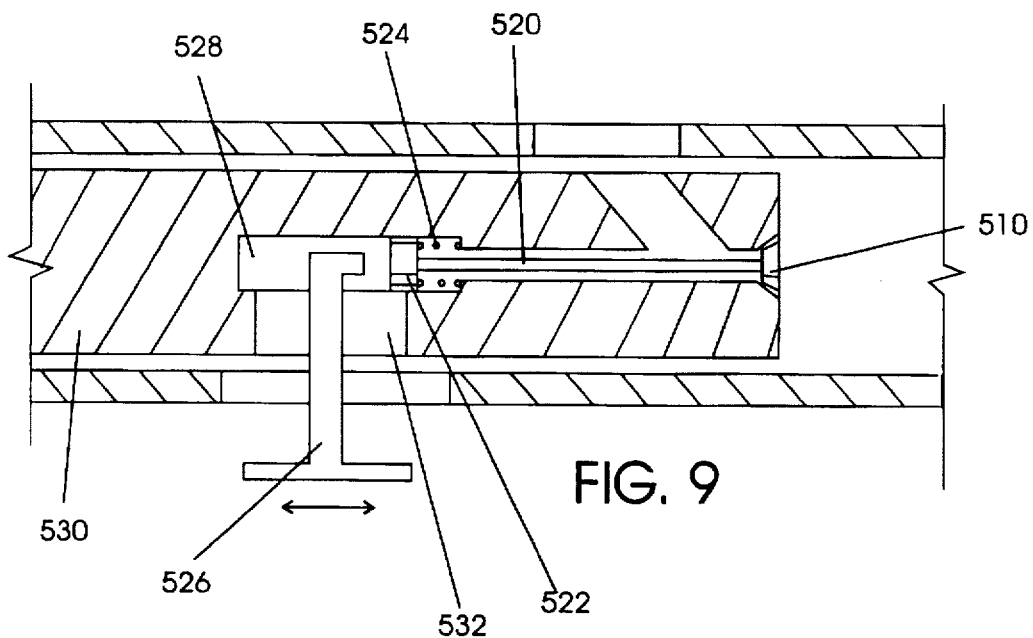
FIG. 9 illustrates another embodiment of the invention.

FIG. 9 illustrates yet another alternative manner of controlling the opening position of a combustion chamber valve 510. The valve 510 is connected through a connecting rod 520 to a cam follower 522 and biased by a spring 524 to a closed position. An axially slidable finger 526 protrudes into a chamber 528 formed in the piston 530, passing through an opening 532 in the piston 530.

When the piston 530 slides sufficiently leftward in FIG. 9 to cause the finger 526 to engage the cam follower 522, further leftward motion of the piston 530 will force the combustion chamber valve 510 open. FIG. 9 therefore illustrates that entirely mechanical actuation of the combustion chamber valves may also alternatively be accomplished. Although the embodiment of FIG. 9 suffers from the substantial disadvantage that the valve will open and close at the same position in piston reciprocation, other similar actuating structures may be utilized and visualized by those of ordinary skill in the art so that the combustion chamber valve 510 may be both opened and closed at different positions by such mechanical structures.

The art of engine combustion and efficiency control has been revolutionized by the advent of cheap and powerful computers. Engines are controlled to an extent far beyond anything realized by the simple mechanical devices of the recent past. Fuel and air mixtures, for example, are controlled cycle by cycle so as to maximize combustion efficiency, using computer controlled injection systems. The engine in the present invention allows an equally profound advance in control of the inlet and exhaust valve motions, so as to allow previously unavailable processes. An important example is the control of the mass flow through the thermodynamic cycle by valve time of closing, so as to eliminate the very wasteful throttling process in the present conventional spark ignition engine. Technical details of the reasons for these controls and their effects are found in papers published in the proceedings of the Society of Automotive Engineers.

In the present invention, the control computer is fed information on piston position by a position sensor of any of the types well known, such as linear variable differential transformers, or proximity sensors operating on a tapered portion of the piston or many others capable of giving an electric voltage proportional to piston position. In addition, the computer receives information from sensors detecting unburned fuel, carbon monoxide, free oxygen and other information which the designer may wish to have so as to simultaneously maximize fuel efficiency and reduce pollution. The control computer then operates to match required power to engine conditions so as to achieve optimum values of power, efficiency and other features, such as responsiveness to a change in power.

Starting of an engine embodying the present invention requires an auxiliary power source, such as a conventional storage battery. Preferably the pistons are at rest at their inner proximal position, although they may also be located at an intermediate position at which a drive spring is relaxed.

For start-up, the control senses the command to start, and directs a small amount of fuel to the combustion chamber where it is ignited by a spark and causes the piston to move toward the outer limit. The combustion chamber has been previously purged at the last cycle of the engine on shutdown. The control opens the exhaust valve and allows an exhaust and purging action from either a previously stored air source or from the outward motion of the piston pumping air by the outer ends of the piston, or from a dedicated blower powered by an electric or hydraulic motor or by the exhaust turbine. The next cycle of the piston will be near normal in power output as described above for steady state operation, except that the valve timing may initially provide a relatively shorter stroke and then the piston position at which the valves are opened and closed is changed as the stroke increases to steady state operation.

During normal operation, if the operator demands more power, the control injects more fuel, while at the same time allowing more air to go through the thermodynamic cycle by earlier closing of the combustion chamber valves. If the power requirement is high, then the control may open the valves earlier in the expansion process so as to give a higher mean effective pressure of the cycle, leaving some residual expansion energy in the exhaust either to be recaptured in an exhaust turbine or wasted to the atmosphere, as is presently done in conventional engines.

If a power reduction is demanded, the control cuts down on the fuel injected and the air mass in the cycle by a later closing of the combustion chamber valves during the purge process. The control takes advantage of the fullest expansion ratio consistent with other demands by a later opening of the exhaust port.

If a low power is demanded, the control may shut down one or more pairs of cylinders and allow only the ones to operate which, at optimum efficiency, can supply the requirement. Thus, a vehicle which has three pairs of pistons may, in city driving, be using only one of them operating at a fraction of its capability. Then when highest power is demanded, the control can start the idle pairs and operate all three at full power. This type of operation can greatly increase the mechanical efficiency of the engine over the conventional one in which all mechanisms must operate even when the power required is very small compared to full engine capability.

Fuel injection rate is not only controlled by power, but also by sensing presence of unburned fuel (indicating excessive fuel injected or deficient air flow) and by presence of carbon monoxide, also indicating deficient air. All of the above is well known to the art, but the flexibility of the free piston engine of the present invention allows full application of optimization strategies previously unavailable as a result of the rigidity of the conventional, fixed displacement and fixed valve timing engines.

Although two opposed pistons are preferred, the principles of the present invention may be applied to a single piston engine terminating at the point of symmetry of the illustrated engines. Such an engine may have a single combustion chamber valve, although use of two combustion chamber valves is more practical. With two valves the engine would operate in the manner previously described. Both valves can be located in the head, both valves can be located in the piston, or one in each with communicating passageways of the type illustrated in the previously described figures. If a single valve is used, then purging and supercharging cannot be accomplished. In such an embodiment, the engine must operate in a fourstroke mode, rather than the two stroke mode described above. In a two-stroke mode, combustion and expansion occur in one stroke, while exhaust, intake and compression all occur in the second stroke. In a four-stroke mode of operation, combustion and expansion occur in one stroke, exhaust occurs in the second stroke, intake occurs in the third stroke, and compression occurs in the fourth stroke. This would allow a higher compression ratio for the same stroke length, but will require more energy storage for driving the piston through the exhaust, intake, and compression strokes.

The present invention can now be seen to provide a variety of advantages. The variable valve timing allowed by the present invention permits independent control of both the expansion ratio and the compression ratio. As a result, the expansion ratio can be greater than the compression ratio and the ratio between them can also be controlled. This allows variation in the power output, while retaining high fuel efficiency at all power levels. Full or near full expansion of the combusted gasses is permitted. Full expansion also makes the engine considerably quieter because the valves open when there is a lower pressure in the combustion chamber, as illustrated at A in FIGS. 6 and 7. For operating the engine in a low power, high efficiency mode, including idle, the valves are timed to provide a higher expansion ratio than compression ratio and to provide a smaller stroke. Consequently, the engine becomes an efficient, small displacement engine at low power. The large excess of expansion beyond compression permits the energy of expansion to be recovered instead of being exhausted with the noise and sudden pressure drop characteristic of a conventional, internal combustion engine. This also eliminates the throttling loss inherent in conventional internal combustion engines where the stroke or swept volume is always constant.

For high power operation, both the compression and expansion ratios can be increased and the compression ratio made nearly equal to the expansion ratio as in a conventional, internal combustion engine. With both ratios and the quantity of injected fuel being increased, the stroke increases making the engine operate as a large displacement engine having an increased, swept volume. The compression ratio can never be quite as large as the expansion ratio because some portion of the compression/purge stroke must be utilized by the purge or supercharge.

Because these timing changes can be made relatively quickly by simply electronically changing the combustion chamber valve opening positions, a rapid, high power boost is possible. Although the efficiency at high power operation is less than at low power operation because the expansion stroke is operating at a higher cycle pressure and the valves open before that pressure is reduced to atmospheric pressure, nonetheless, control of the timing provides more efficient operation than is currently available.

Another advantage of a practical and efficient free piston internal combustion engine is that it permits the use of gas bearings, particularly between the piston and cylinder, rather than oil based lubricants. Gas bearings can be used because there are no side loads, such as result from the use of a crank mechanism. Gas bearings provide essentially non-contact motion, do not require rings, and therefore provide minimum wear and maximum lifetime. Elimination of oil based lubricants eliminates a major source of cylinder fouling and exhaust pollution. The engine runs without oil and has no side loads so it may run very hot and not need a conventional cooling jacket, thus decreasing cost and increasing efficiency since heat loss during expansion is minimized.

Different fuels will require different control algorithms, including different piston positions at which the combustion chamber valves are opened and closed, fuel is injected and ignition is initiated.

For the use of natural gas as a fuel, the fuel would preferably be injected just after point B in FIGS. 6–8 at which the combustion chamber valves are closed. This would allow a low pressure gas injection and good mixing of the fuel and air before ignition.

An engine constructed according to the present invention has mechanical simplicity, light weight, low cost and a relatively long life and would be especially useful as an adjunct power source for an electric vehicle. The free piston internal combustion engine of the invention allows full variability of inlet and exhaust valve timing, fuel injection and ignition timing, and variable piston swept volume, as well as capability of operating only some of the pistons in a multiple cylinder engine while leaving some non-operational. The power of an internal combustion engine is proportional to the mass flow rate of air going through the thermodynamic cycle within the combustion chamber. Consequently, in embodiments of the invention, it is proportional to the volume of gas in the cylinder when the combustion chamber valves close and compression begins. That volume is variably controllable in embodiments of the invention. The free piston purely linear motion eliminates side forces on the pistons so as to allow use of gas bearings, eliminating the need for oil, and because of the absence of oil on the surfaces, allowing adiabatic (non-cooled) operation using suitable high temperature materials (ceramics) for the cylinder walls.

While certain preferred embodiments of the present invention have been disclosed in detail, it is to be understood that various modifications may be adopted without departing from the spirit of the invention or scope of the following claims.

I claim:

1. In a free piston internal combustion engine including at least one piston slidingly reciprocatable in a cylinder and having an end face bounding and defining a combustion chamber portion of the cylinder, the engine also including a driver linked to the piston for driving the piston through its compression stroke and a fuel injector in communication with the combustion chamber, the improvement comprising:

(a) a combustion chamber valve in a passageway extending between the combustion chamber and the earth's atmosphere for controlling passage of gas between the combustion chamber and the earth's atmosphere;

(b) a valve closing actuator linked to the combustion chamber valve;

(c) a first, piston-position sensor linked to the valve closing actuator and initiating closure of the valve in response to a selected first position of the piston in the cylinder; and (d) a piston-position responsive valve opening actuator wherein the valve opening and closing events may vary relative to piston position to affect power output linked to the combustion chamber valve.

2. An engine in accordance with claim 1 wherein the valve opening actuator comprises a spring biasing the valve toward its open position for opening the valve in response to the combustion chamber pressure falling to less than a selected pressure so that the force of the spring exceeds the force of the net, differential pressure on the valve.

3. An engine in accordance with claim 1 wherein said actuators comprise a fluid actuator responsive to the pressure applied to the fluid actuator from a fluid pressure source and controlled by an interposed control valve, the control valve being connected to and actuated by the piston position sensor.

4. An engine in accordance with claim 3, wherein the piston position sensor senses both said selected first position of the piston and a second position of the piston and actuates the control valve to open the combustion chamber valve in response to detection of the selected second piston position.

5. An engine in accordance with claim 1 or 2 or 3 or 4 and further comprising:

a second combustion chamber valve in a second passageway extending between the combustion chamber and the earth's atmosphere for controlling passage of gas between the combustion chamber and the earth's atmosphere, said second combustion chamber valve being adapted for opening when said first combustion chamber valve is opened and closing when said first combustion chamber valve is closed.

6. An engine in accordance with claim 5 wherein an air blower is connected in communication with a passageway for forcing air through the cylinder when said combustion chamber valves are open.

7. An engine in accordance with claim 6 wherein said second combustion chamber valve is a check valve directed to permit fluid flow into the combustion chamber.

8. A multi-stage engine comprising a plurality of individual engines, each individual engine in accordance with claim 6 wherein the pistons of said multi-stage engine are linked to supply output power to the same load and wherein the individual engines are independently operable for simultaneously operating selected individual engines, including fewer than all the individual engines.

9. A multi-stage engine in accordance with claim 8 wherein the valve actuators of the individual engines are connected to and controlled by a computer, the computer selectively enabling the operation of selected individual engines in response to load demand.

10. An engine in accordance with claim 1 or 2 or 3 or 4 wherein a second, opposed piston is slidingly reciprocatable in the cylinder and has an end face bounding and defining the combustion chamber.

11. An engine in accordance with claim 10 and further comprising:

a second combustion chamber valve in a second passageway extending between the combustion chamber and the earth's atmosphere for controlling passage of gas between the combustion chamber and the earth's atmosphere, said second combustion chamber valve being adapted for opening when said first combustion chamber valve is opened and closing when said first combustion chamber valve is closed.

12. An engine in accordance with claim 9 and further comprising an air blower mounted to the engine in communication with the passage of one of said combustion chamber valves and forcing atmospheric air into the combustion chamber when said combustion chamber valves are open for purging combustion gases and charging the combustion chamber with air.

13. A multi-stage engine comprising a plurality of individual engines, each individual engine in accordance with claim 10 wherein the pistons of said multi-stage engine are linked to supply output power to the same load and wherein the individual engines are independently operable for simultaneously operating selected individual engines, including fewer than all the individual engines.

14. A multi-stage engine in accordance with claim 13 wherein the valve actuators of the individual engines are connected to and controlled by a computer, the computer selectively enabling the operation of selected individual engines in response to load demand.

15. An engine in accordance with claim 12 wherein said second combustion chamber valve is a check valve directed to permit fluid flow into the combustion chamber.

16. An engine in accordance with claim 12 wherein one of said combustion chamber valves is mounted in said end face of each of said pistons.

17. An engine in accordance with claim 12 and further comprising electrodes in the combustion chamber forming a spark gap and connected to an electrical discharge circuit for initiating combustion.

18. An engine in accordance with claim 12 wherein said actuators comprise a fluid actuator responsive to the pressure applied to the fluid actuator from a fluid pressure source and controlled by an interposed control valve, the control valve being connected to and actuated by the piston position sensor.

19. An engine in accordance with claim 18 wherein the fluid pressure source is an accumulator pumped with pressurized gas by a pump drivingly linked to at least one of said pistons.

20. An engine in accordance with claim 19 wherein the fluid pressure operated valve actuator includes a valve actuating piston connected to the valve, reciprocating in a cylinder formed in the piston.

21. An engine in accordance with claim 5 wherein said actuators comprise solenoids, each solenoid having at least two states, one opening its associated combustion chamber valve and one closing its associated combustion chamber valve.

22. A method for operating a free piston internal combustion engine including at least one piston having an end face bounding and defining a combustion chamber portion of the cylinder, the piston being slidingly reciprocatable between maximum and minimum combustion chamber volumes, the engine also including a driver linked to the piston for driving the piston through its compression stroke and having a fuel injector in communication with the combustion chamber, the method comprising:

(a) venting the combustion chamber at a piston position near the end of an expansion stroke to terminate an expansion of combustion gas and initiate exhaust of combustion products;

(b) terminating the venting at a piston position to terminate the exhaust and initiate compression; and (c) varying at least one of said valve opening and valve closing events relative to piston positions in response to variations in desired output power.

23. A method in accordance with claim 22 wherein engine operation includes varying at least one of said selected piston positions to increase the ratio of expansion displacement to compression displacement as output power is decreased.

24. A method in accordance with claim 23 and further comprising:

(a) detecting when the piston is at a first, expansion stroke terminating position; and (b) opening a valve in communication between the combustion chamber and the earth's atmosphere when the piston is at said first position.

25. A multi-stage engine comprising a plurality of individual engines, each individual engine in accordance with claim 22 or 23 or 24 wherein the pistons of said multi-stage engine are linked to supply output power to the same load and wherein the individual engines are independently operable for simultaneously operating selected individual engines, including fewer than all the individual engines.

26. A multi-stage engine in accordance with claim 25 wherein the valve actuators of the individual engines are connected to and controlled by a computer, the computer selectively enabling the operation of selected individual engines in response to load demand.

* * * * *